United States Patent
Park

(10) Patent No.: US 8,655,402 B2
(45) Date of Patent: Feb. 18, 2014

(54) PRIVATE BRANCH EXCHANGE SYSTEM AND SERVICE METHOD FOR DISTRIBUTING SMS MESSAGES TO EXTENSION UNITS

(75) Inventor: Seok-Hong Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1764 days.

(21) Appl. No.: 11/220,567

(22) Filed: Sep. 8, 2005

(65) Prior Publication Data

US 2006/0058050 A1    Mar. 16, 2006

(30) Foreign Application Priority Data

Sep. 10, 2004    (KR) .............................. 10-2004-73595

(51) Int. Cl.
*H04M 1/00*    (2006.01)
*H04W 4/00*    (2009.01)

(52) U.S. Cl.
USPC ...................................... 455/554.1; 455/466

(58) Field of Classification Search
USPC ....................................... 455/555, 554.1, 466
See application file for complete search history.

(56) References Cited

U.S. PATENT DOCUMENTS

| | | | |
|---|---|---|---|
| 6,574,470 B1 * | 6/2003 | Chow et al. ................... | 455/417 |
| 6,594,255 B1 | 7/2003 | Neuman | |
| 7,039,025 B1 * | 5/2006 | Menon et al. ................. | 370/328 |
| 7,065,372 B2 * | 6/2006 | Ham .............................. | 455/466 |
| 2003/0144015 A1 * | 7/2003 | Ham .............................. | 455/466 |

FOREIGN PATENT DOCUMENTS

| | | |
|---|---|---|
| EP | 1 406 457 | 4/2004 |
| KR | 1020040009730 | 1/2004 |
| KR | 20040019181 A1 | 3/2004 |
| KR | 1020040023442 | 3/2004 |

OTHER PUBLICATIONS

An article "Access and Terminals (AT); Short Message Service (SMS) for PSTN/ISDN; Short Message Communication between a fixed network Short Message Terminal Equipment and a Short Message Service Centre" written by ETSI Standard, V1.2.1 on Aug. 2004.
An on-line discussions "SMSC to SMSC message" on Jul. 29, 2002,XP002358066, <URL:http://smsforum.net/yabbse/index.php?board=8;action=display;threadid-319>.
An on-line discussions "International SMS VAS" on Dec. 18, 2003,XP002358067, <URL:http://smsforum.net/smf/index.php?PHPSESSID=7ba786c7aa75d07dcae0b4aa970abf00&topic=1131.msg2738>.

(Continued)

*Primary Examiner* — Huy C Ho
(74) *Attorney, Agent, or Firm* — H.C. Park & Associates, PLC

(57) ABSTRACT

The present invention relates to a PBX system for providing exchange service to a number of extension subscribers. In the PBX system, a main exchange center provides a private branch exchange service to a number of extension subscribers. When a ring is received via a main line, the main exchange center judges whether the ring is received from an SMSC, and if the ring is received from the SMSC, notifies the receipt of an SMS message. An SMS processor receives the SMS message from the SMSC via the main exchange center, extracts an originating or destination unit data therefrom, refers to previously stored extension unit-matching information to search for at least one destination extension unit which the SMS message is headed for, and distributes the SMS message to the destination extension unit.

10 Claims, 8 Drawing Sheets

(56) References Cited

OTHER PUBLICATIONS

A Web page "History of Asterisk and Sms—version 15" from<URL:http://www.viop-info.org/wiki/page_history.php-?page_id=992&preview=15> on Jul. 6, 2004.

Transmittal Letter, along with a Korean Office Action dated May 28, 2009 in corresponding Korean Patent Application No. 2004-0073595.

* cited by examiner

FIG. 6

| DDI | SMS DEST |
|---|---|
| 4301 | 2001 |
| 4302 | 2002 |
| 4303 | 2003 |
| 4304 | 2004 |
| ⋮ | ⋮ |
| 4400 | 2100 |

FIG. 7

|   | 2001 | 2002 | 2003 | 2004 |
|---|---|---|---|---|
| 1 | ▓ | ▓ | ▓ | ▓ |
| 2 | ▓ | ▓ |   | ▓ |
| 3 | ▓ |   |   | ▓ |
| 4 | ▓ |   |   |   |
| 5 | ▓ |   |   |   |
| 6 |   |   |   |   |
| 7 |   |   |   |   |

FIG. 8

| MSN | SMS DEST |
|---|---|
| 4301 | 2001 |
| 4302 | 2002 |
| 4303 | 3000 |
| ⋮ | ⋮ |
| 4400 | 2100 |

FIG. 9

| GROUP | SMS DEST |
|---|---|
| 3000 | 3001<br>3002<br>3003<br>⋮ |
| 4000 | 4001<br>4002<br>⋮ |

FIG. 10

| CID | SMS DEST |
|---|---|
| 02-AAA-AAAA | 2001 |
| 02-BBB-BBBB | 2002 |
| 031-CCC-CCCC | 2003 |
| 010-DDD-DDDD | 2004 |
| ⋮ | ⋮ |

FIG. 11

| MAIN LINE | sub-address | destination | MAIN LINE | sub-address | destination |
|---|---|---|---|---|---|
| 7001(279-4301) | 0 | 2001 | 7003(279-4303) | 0 | 2021 |
| | 1 | 2002 | | 1 | 2022 |
| | 2 | 2003 | | 2 | 2023 |
| | 3 | 2004 | | 3 | 2024 |
| | 4 | 2005 | | 4 | 2025 |
| | 5 | 2006 | | 5 | 2026 |
| | 6 | 2007 | | 6 | 2027 |
| | 7 | 2008 | | 7 | 2028 |
| | 8 | 2009 | | 8 | 2029 |
| | 9 | 2010 | | 9 | 2030 |
| 7002(279-4302) | 0 | 2011 | 7004(279-4304) | 0 | 2031 |
| | 1 | 2012 | | 1 | 2032 |
| | 2 | 2013 | | 2 | 2033 |
| | 3 | 2014 | | 3 | 2034 |
| | 4 | 2015 | | 4 | 2035 |
| | 5 | 2016 | | 5 | 2036 |
| | 6 | 2017 | | 6 | 2037 |
| | 7 | 2018 | | 7 | 2038 |
| | 8 | 2019 | | 8 | 2039 |
| | 9 | 2020 | | 9 | 2040 |

# PRIVATE BRANCH EXCHANGE SYSTEM AND SERVICE METHOD FOR DISTRIBUTING SMS MESSAGES TO EXTENSION UNITS

CLAIM OF PRIORITY

This application makes reference to, incorporates the same herein, and claims all benefits accruing under 35 U.S.C. §119 from an application for PRIVATE BRANCH EXCHANGE SYSTEM AND METHOD FOR SHORT MESSAGE SERVICE ACCORDING TO SUBSCRIBER LINE THEREBY earlier filed in the Korean Intellectual Property Office on Sep. 10, 2004 and there duly assigned Serial No. 2004-73595.

BACKGROUND OF THE INVENTION

1. Field of the Invention

The present invention relates to Short Message Service (SMS) in a private branch exchange (PBX), and more particularly, to a PBX system and a service method by which SMS messages received via a main line are distributed to extension units.

2. Description of the Related Art

In general, a PBX is a small sized exchange system to switch and connect extension calls in a specific zone, and widely used for intercommunication in a company or office. At present days, mobile communication service users have been rapidly increased, and subscribers using a mobile communication even in a company also have been increased.

Accordingly, there has been introduced a wireless PBX which has a mobile communication function to provide a private mobile communication service to mobile units existing in a specific zone such as a company.

A wireless PBX includes a Base Station Controller (BSC) and a Mobile Switching Center (MSC) to provide a wired/wireless exchange service to mobile extension units in order to realize a wireless PBX service. Then, in a service zone of the wireless PBX, subscribers can call any mobile extension units registered to the wireless PBX free of charge.

In the meantime, a Short Message Service (SMS) may be referred to as an individual subscriber service since it is provided to individual units. In case that several subscribers share a single unit, sub-addresses can be used to identify the individual subscribers from one another. However, these are serviced only to home telephones, and the PBX provides the Short Message Service (SMS) as an internal function thereof.

In case of a Short Message Service (SMS) received at the same number, it is possible to identify actual receivers by using ten sub-addresses from 0 to 9. However, since a number of subscribers share the same main or office line, only ten sub-addresses are not sufficient for the PBX to provide a satisfactory service. For example, when twenty PBX subscribers use the same main line, only ten subscribers can be serviced even if sub-addresses are provided from a Short Message Service Center (SMSC). Because of these restrictions, a conventional PBX can hardly provide an SMS in practice.

SUMMARY OF THE INVENTION

It is, therefore, an object of the invention to provide a private branch exchange (PBX) system and a Short Message Service (SMS) method, by which SMS messages received via a main line are distributed to extension units based upon originating or destination unit information contained in the SMS messages.

According to an aspect of the invention for realizing the above object, there is provided a PBX system comprising: a main exchange center providing a private branch exchange service to a number of extension subscribers, and when a ring is received via a main line, judging whether the ring is received from a Short Message Service Center (SMSC), and if the ring is received from the SMSC, notifying the receipt of an SMS message; and an SMS processor receiving the SMS message from the SMSC via the main exchange center, extracting an originating or destination unit data therefrom, referring to previously stored extension unit-matching information to search for at least one destination extension unit which the SMS message is headed for, and distributing the SMS message to the destination extension unit.

According to another aspect of the invention for realizing the above object, there is provided an SMS method in a PBX system, the method comprising steps of: upon receiving a ring via a main line, judging whether or not the ring is received from a Short Message Service Center (SMSC), and if the ring is received from the SMSC, notifying the receipt of an SMS message; establishing a communication path with the SMSC and storing the SMS message transferred from the SMSC into a first memory area; analyzing the SMS message stored in the first memory region and extracting originating unit information and/or destination unit information from the SMS message; and comparing the originating unit information and/or the destination unit information based upon extension unit-matching information to inquire information of an extension unit which the SMS message is headed for, and distributing and storing the SMS message into a memory region of a second memory area assigned to the extension unit.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein:

FIG. 6 is an extension unit-matching information table in the PBX system of the invention, which uses DDI (direct dial-in) numbers extracted from SMS messages;

FIG. 7 is a table illustrating the structure of a second buffer of the invention;

FIGS. 8 and 9 are another extension unit-matching information tables in the PBX system of the invention, which use MSN (multi-subscriber numbering) numbers extracted from SMS messages;

FIG. 10 is other extension unit-matching information table in the PBX system of the invention, which uses CID (caller identification) of originating units extracted from SMS messages; and FIG. 11 is yet another extension unit-matching information table in the PBX system of the invention, which uses sub-addresses extracted from SMS messages.

DETAILED DESCRIPTION OF THE PREFERRED EMBODIMENTS

Hereinafter a SMS (Short Message Service) method and system for extension lines in a PBX (Private Branch Exchange) system of the invention will be described with reference to the accompanying drawings.

Figure 1:
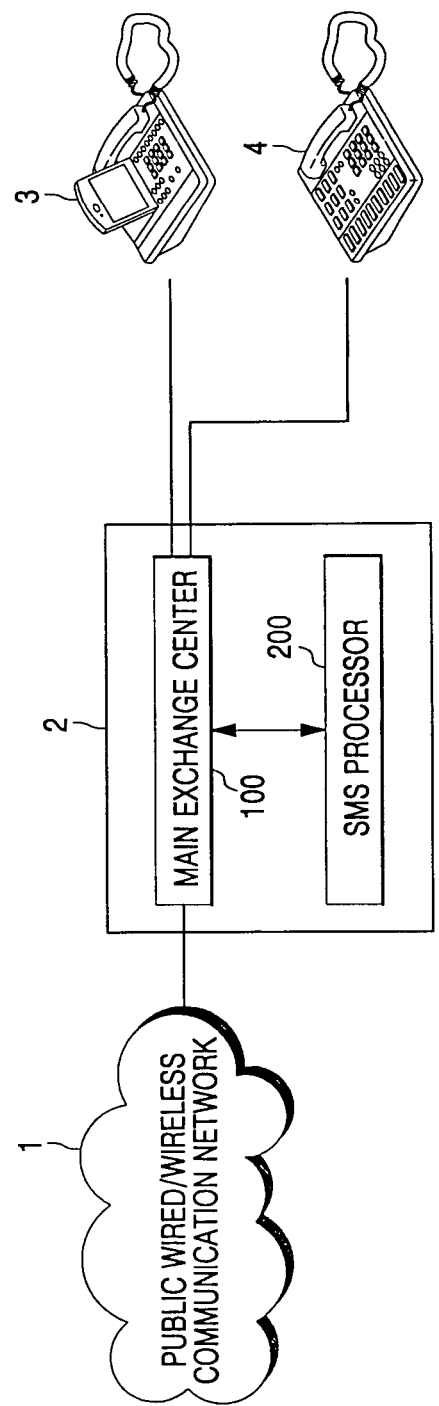
FIG. 1 is a block diagram illustrating a PBX system for providing an SMS to extension lines according to a preferred embodiment of the present invention.

FIG. 1 is a block diagram illustrating a PBX system 2 for providing an SMS to extension lines according to an embodiment of the invention.

Referring to FIG. 1, connected to a public communication network 1 is the PBX system 2 of the invention includes a main exchange (switching) center 100 for providing a private exchange service to a number of extension subscribers 3 and 4 and an SMS unit 200 cooperating with the main exchange center 100 to distribute SMS messages received via a main line to extension units in order to provide an SMS to the extension units 3 and 4.

The main exchange center 100 executes a general private exchange function of the PBX system 2 while cooperating with the SMS processor 200 to provide the short message service to the extension units.

The main exchange center 100 cooperates with the SMS processor 200 to provide a short message service (SMS) to individual extension units 3 and 4. Upon receiving a ring via a main line, the main exchange center 100 judges whether the ring is a general telephone ring or one received from an SMS center (hereinafter will be referred to as SMSC: not shown). If the ring is received from the SMSC, the main exchange center 100 notifies the SMS processor 200 of the SMSC ring.

Upon being notified of the SMSC ring by the main exchange center 100, the SMS processor 200 establishes a communication path with the SMSC to store an SMS message from the SMSC into a preset buffer, and analyzes the SMS message to search for an extension unit which the SMS message is headed for.

The SMS message received from the SMSC contains originating unit information, i.e., the information of an originating unit which transfers the SMS message, and destination unit information, i.e., the information of a destination unit which the SMS message is headed for. The originating unit information may include Caller Identification (CID), and the destination unit information may include DDI (direct dial-in) number, MSN (multi-subscriber numbering) number and sub-address number.

The SMS processor 200 has the matching information of extension units in the PBX system 2 (hereinafter will be referred to shortly as "extension unit-matching information") in order to search for the extension unit which the SMS message is headed for, based upon the originating unit information and destination unit information. The extension unit-matching information can be established in the form of a table.

The extension unit-matching information can be constituted of different types according to main line interface types used in the main exchange center 100 of the PBX system 2.

That is, the destination unit information utilizes a sub-address number in case that the main line interface of the main exchange center 100 is an analog main line. In case that the main line interface of the main exchange center 100 is a digital main line, the destination unit information can utilize a DDI number and an MSN number also in addition to the sub-address number.

Because of this reason, the destination unit information is matched with the information of individual extension units according to main line interface. In addition, the CID of an originating unit, which transfers an SMS message, may be matched with the information of the individual extension units of the PBX system 2.

The SMS processor 200 also has a memory area for storing SMS messages received from the SMSC. The memory area may be divided into first and second memory areas.

The first memory area stores the SMS messages received from the SMSC without grouping the SMS messages according to the extension units. The second memory area analyzes the SMS messages stored in the first memory area according to corresponding ones of the extension units which the SMS messages are headed for, respectively, and stores the SMS messages according to the extension units.

Accordingly, the SMS processor 200 analyzes the SMS messages stored in the first memory area based upon the extension unit-matching information to search for the corresponding extension units which the SMS messages are headed for, respectively. Upon finding the extension units which the SMS messages are headed for, the SMS processor 200 stores the SMS messages into memory regions of the second memory area assigned to the extension units in order to transmit the SMS messages to the extension units.

Then, the SMS processor 200 sends a ring signal to the extension units via the main exchange center 100 notifying the extension units of the SMS messages.

When an extension unit sends a request signal to the PBX system 2 to receive a corresponding SMS message, the main exchange center 100 transfers the SMS messages stored in the SMS processor 200 toward the extension unit, respectively.

The operation of the PBX system 2 of the above structure will now be described with reference to FIG. 2, which is a flowchart of an SMS method for extension lines in the private exchange system according to an embodiment of the invention.

Figure 2:
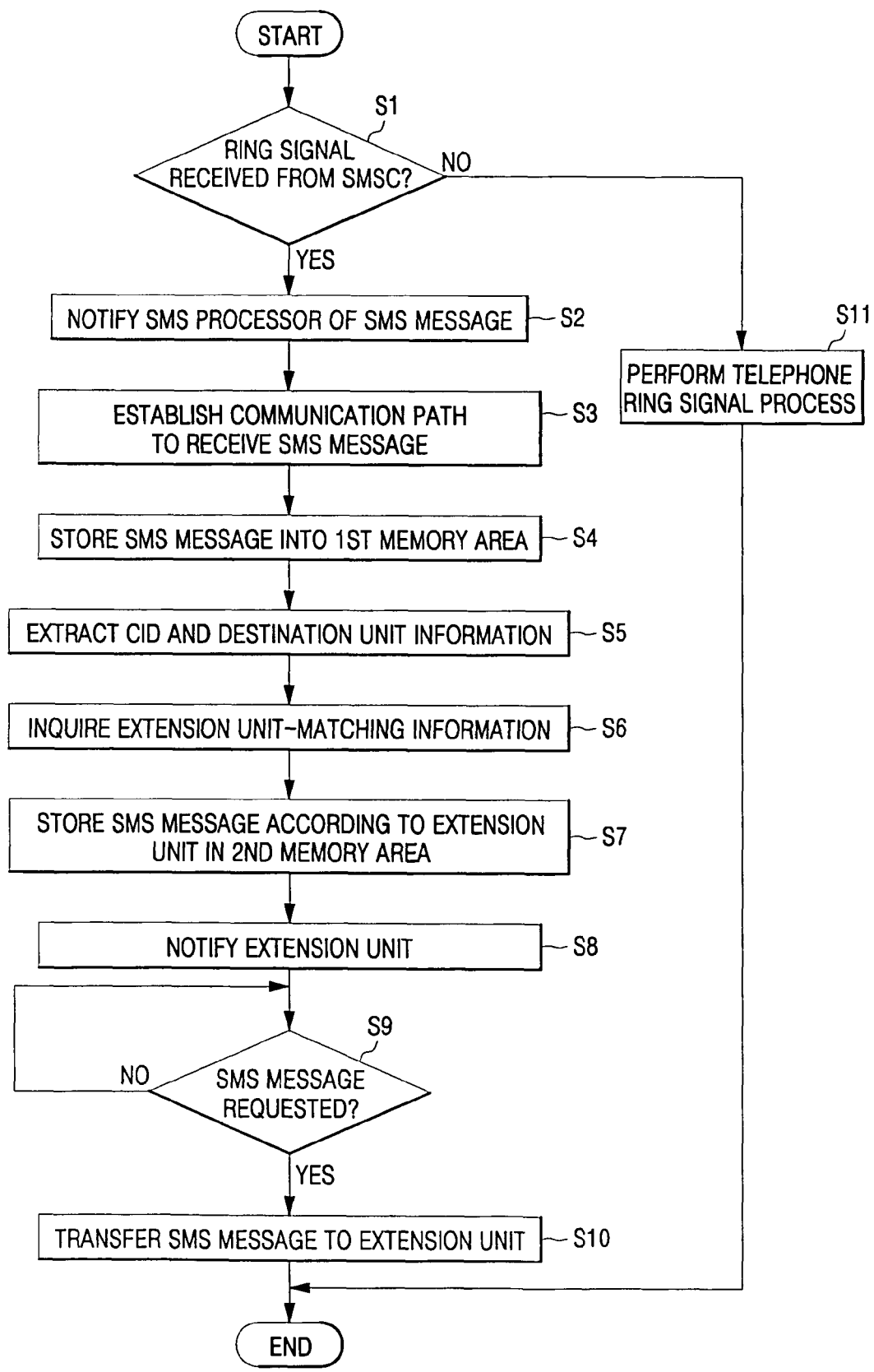
FIG. 2 is a flowchart of an SMS method for extension lines in the private exchange system according to a preferred embodiment of the present invention.

Referring to FIG. 2, when the PBX system 2 receives a ring signal via the main line, the main exchange center 100 judges whether the ring signal is a telephone ring signal or an SMS ring signal received from a specific SMSC in step S1.

If the ring signal received is from the SMSC, the main exchange center 100 notifies the SMS processor 200 of an SMS message in step S2. However, if the ring signal is a telephone signal, a telephone ring signal process is executed in step S11.

Upon being notified of the SMS message by the main exchange center 100 in step S2, the SMS processor 200 establishes a communication path with the SMSC to receive the SMS message from the SMSC in step S3, and stores the received SMS message into the first memory area in step S4.

Then, the SMS processor 200 analyzes the SMS message stored in the first memory area to search for originating unit information (e.g., caller ID information CID) and/or destination unit information contained in the SMS message in step S5.

In succession, the SMS processor 200 compares the originating unit information or the destination unit information based upon the extension unit-matching information to search for any information of a corresponding extension unit which the SMS message is headed for in step S6.

Upon finding the extension unit information, the SMS processor 200 stores the SMS message into a memory region of the second memory area assigned to the corresponding extension unit in step S7.

Then, the SMS processor 200 notifies the corresponding extension unit of the SMS message via the main exchange center 100 in step S8.

The main exchange center 100 judges whether or not the corresponding extension unit sends a signal requesting the SMS message stored in the SMS processor 200 in step S9.

If the signal requesting the SMS message is received from the corresponding extension unit, the main exchange center 100 transfers the SMS message stored in the second memory area of the SMS processor 200 toward the corresponding extension unit in step S10.

Figure 3:
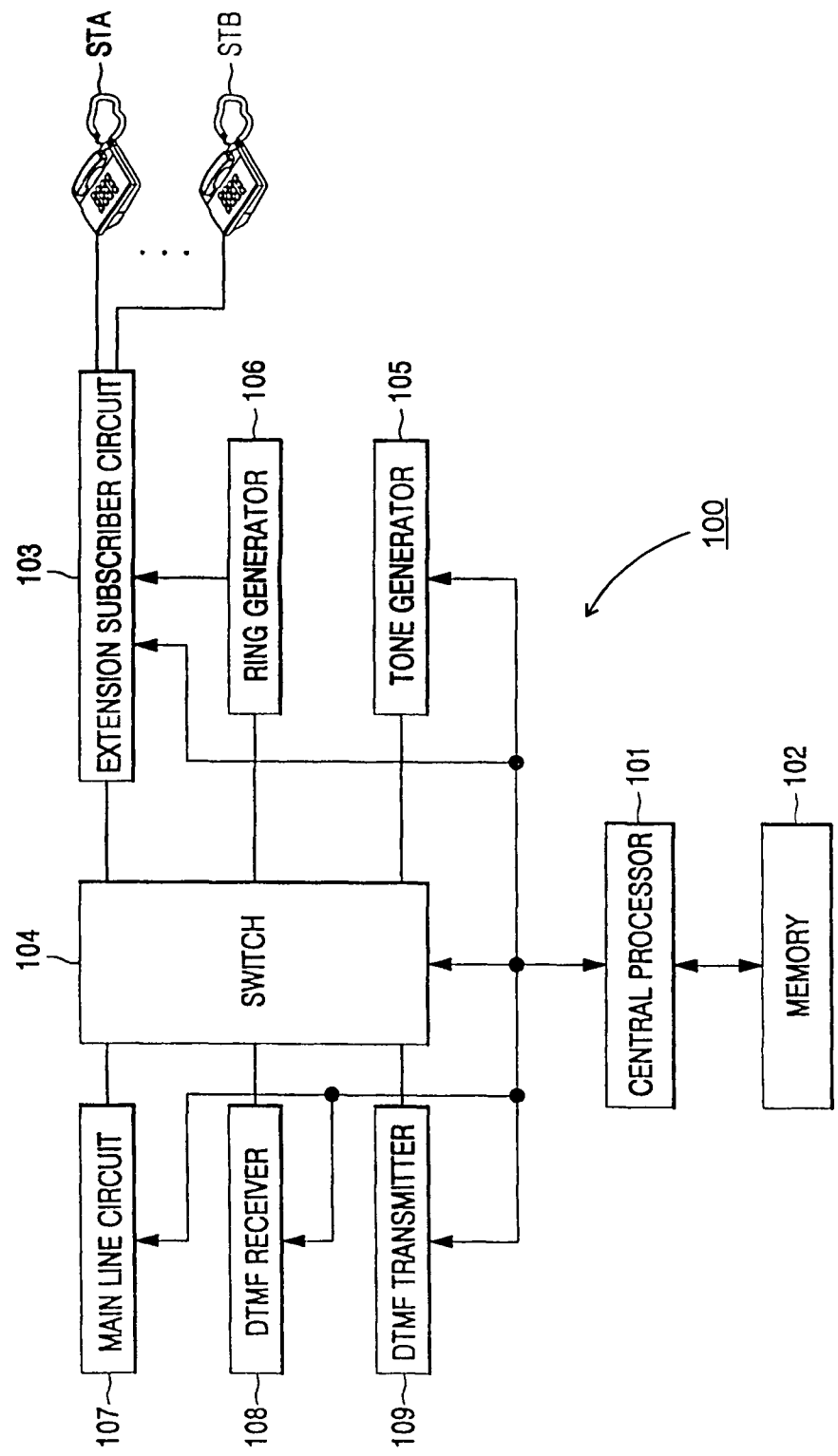
FIG. 3 is a block diagram illustrating a main exchange center in the PBX system according to a preferred embodiment of the present invention.

FIG. 3 is a block diagram illustrating the main exchange center 100 in the PBX system 2 according to the embodiment of the invention.

Referring to FIG. 3, the main exchange center 100 according to the invention includes a central processor 101, a memory 102, an extension subscriber circuit 103, a switch 104, a tone generator 105, a ring generator 106, a main line circuit 107, a DTMF (Dual Tone Multi-Frequency) receiver 108 and a DTMF transmitter 109.

The central processor 101 executes a switching function of the PBX system 2 while controlling the overall operation thereof.

The central processor 101 also cooperates with the SMS processor 200 to provide an SMS to individual extension units. Upon receiving a ring from the main line circuit 107, the central processor 101 judges whether the ring is a telephone ring or an SMS ring received from the SMSC. If the ring is the SMSC ring, the central processor 101 notifies the SMS processor 200 of the SMSC ring.

Also, when a received request signal from the SMS processor 200, which requests the main exchange center 100 to notify a corresponding extension unit (STA or STB) of the receipt of the SMS message, the central processor 101 transfers a ring signal generated by the ring generator 106 toward the corresponding extension unit via the switch 104, notifying the corresponding extension unit of the SMS message.

Then, upon receiving a request signal from the extension unit via the extension subscriber circuit 103, which requests the SMS message, the central processor 101 transfers the SMS message stored in the SMS processor 200 toward the extension unit via the switch 104 and the extension subscriber circuit 103.

The memory 102 has operation control programs of the PBX system 2 installed therein, and temporarily stores data created during operation of the programs.

The extension subscriber circuit 103 functions to supply audio current to the extension subscribers (STA and STB) as well as execute interfacing with other PBX systems.

The switch 104 functions to switch various tones and speech data under the control of the central processor 101.

The tone generator 105 generates various tone signals and supplies the tone signals to the switch 107 under the control of the central processor 101.

The ring generator 106 generates ring signals to be supplied to subscriber lines.

The main line circuit 107 seizes the main line under the control of the central processor 101 to form a main line loop and interface incoming signals received via the main line.

The DTMF receiver 108 analyzes Dual Tone Multi-Frequency (DTMF) signals generated from the extension subscribers to apply corresponding digit data to the central processor 101.

The DTMF transmitter 109 outputs DTMF signals under the control of the central processor 101.

Not shown are a switching center that has a number of function keys and display lamps for call relaying between the main line and the extension units, and a connecting circuit for interfacing signals with the switching center under the control of the main processor.

Figure 4:
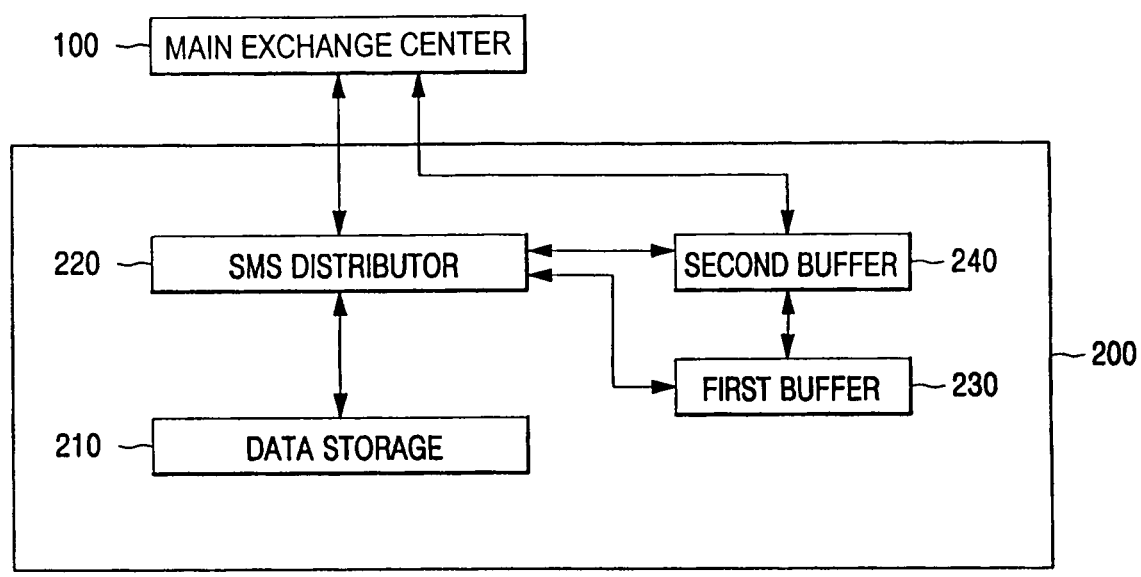
FIG. 4 is a block diagram illustrating an SMS processor in the PBX system according to a preferred embodiment of the present invention.

FIG. 4 is a block diagram illustrating the SMS processor 200 in the PBX system 2 according to the invention.

Referring to FIG. 4, the SMS processor 200 of the invention includes a data storage 210, an SMS distributor 220, a first buffer 230 and a second buffer 240.

Data storage 210 stores extension unit-matching information by which DDI numbers or MSN numbers in main line incoming signals (i.e., signals received via the main line) can be analyzed to search for extension units which the SMS messages are headed for. The extension unit-matching information can be stored in the form of a table, in which the individual extension units are designated according to the DDI or MSN numbers.

Alternatively, the extension unit-matching information can have a table in which the individual extension units are designated according to the CID of the originating units.

The SMS distributor 220 temporarily stores the SMS message received via the main exchange center 100 into the first buffer 230, analyzes the SMS message stored in the first buffer 230 to store the SMS message into the second buffer 240 according to a corresponding extension unit, and notifies the corresponding extension unit of the SMS message via the main exchange center 100.

The first buffer 230 stores the SMS message received via the SMS processor 220 irrespective of the extension unit.

The second buffer 240 stores the SMS message according to the corresponding extension unit which the SMS message is headed for.

The operation of the PBX system 2 of the invention having the above structure will now be described with reference to FIG. 5, which is a flowchart illustrating an SMS method for extension lines in the PBX system 2 according to the embodiment of the invention.

Figure 5:
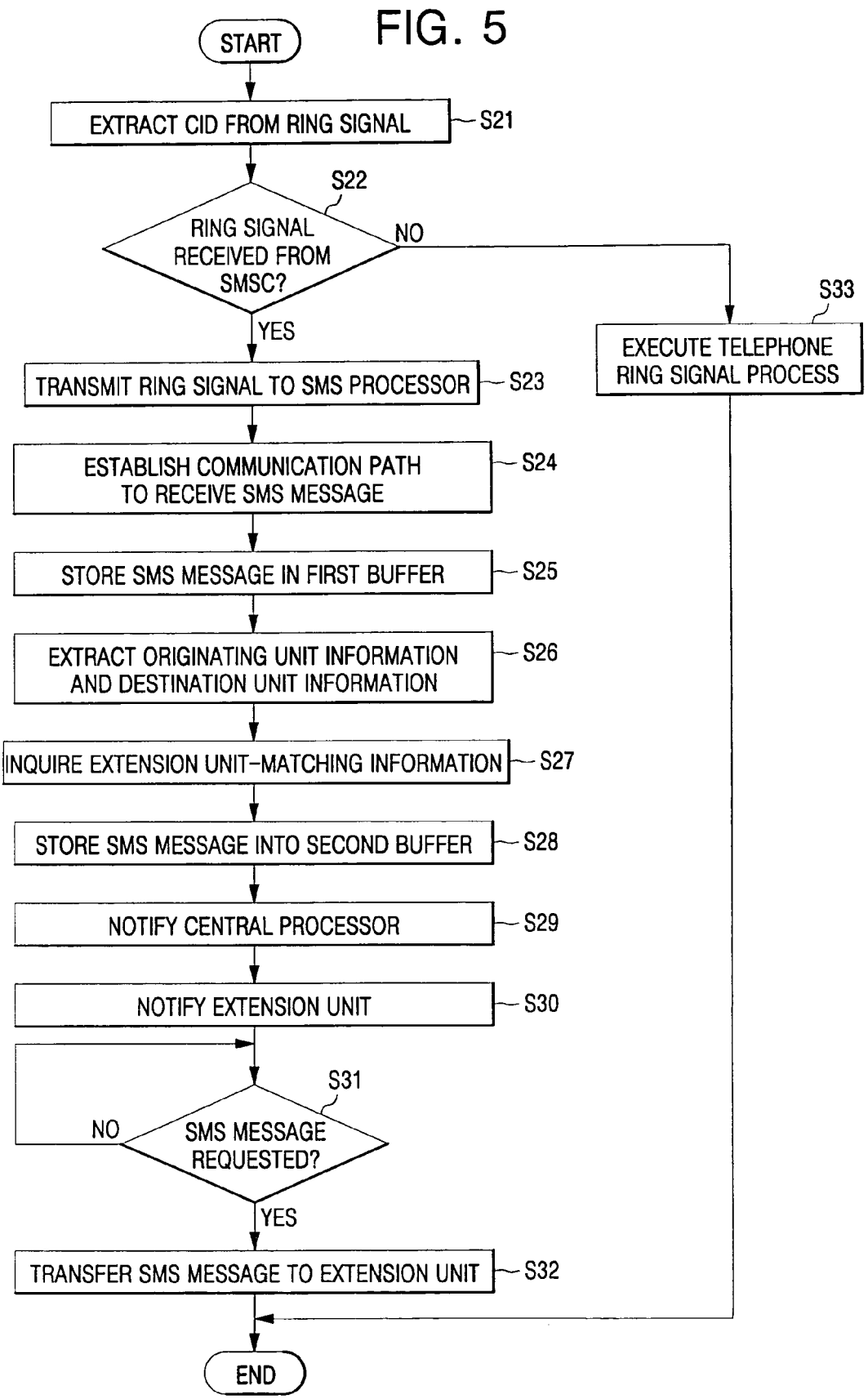
FIG. 5 is a flowchart illustrating an SMS method for extension lines in the PBX system according to a preferred embodiment of the present invention.

Referring to FIG. 5, upon receiving a ring signal via the main line circuit 107, the central processor 101 of the main exchange center 100 extracts a caller ID from the ring signal in S21. The central processor 101 refers to SMSC information stored in the memory to judge whether the ring signal is a telephone ring signal or an SMS ring signal received from a specific SMSC in S22.

If it is judged that the ring signal is not received from the SMSC, the central processor 101 of the main exchange 100 executes a telephone ring signal process in step S33 transmits the ring signal received via the main line circuit 107 to one or more of the extension units, informing the extension units of an incoming call.

If it is judged that the ring signal is received from the SMSC, the central processor 101 of the main exchange center 100 transmits the ring signal received via the main line circuit 107 to the SMS processor 200 via the switch 104 in step S23.

Upon receiving the ring signal via the switch 104 of the main exchange center 100, the SMS distributor 220 establishes a communication path with the corresponding SMSC to receive an SMS message transmitted from the SMSC in step S24.

The SMS distributor 220 stores the SMS message received from the SMSC into the first buffer 230 in step S25.

Then, the SMS processor 200 analyzes the SMS message stored in the first buffer 230 to extract originating unit information and/or destination unit information from the SMS message in step S26.

In step S27, the SMS processor 200 retrieves the extension unit-matching information stored in the data storage 210 with reference to the originating unit information or the destination unit information extracted from the SMS message so as to inquire the information of an extension unit which the SMS message is headed for.

When the information of the corresponding extension unit is found in the data storage 210, the SMS distributor 220 reads the SMS message from the first buffer 230 and stores the SMS message into a memory region of the second buffer 240 assigned to the corresponding extension unit in step S28.

In step S29, the SMS distributor 220 notifies the central processor 101 of the main exchange center 100 of the receipt of the SMS message which is headed for the corresponding extension unit.

In step S30, the central processor 101 of the main exchange center 100 transfers a ring signal generated by the ring generator 106 to the corresponding extension unit via the switch 104 and the extension subscriber circuit 103, informing the corresponding extension unit of the SMS message.

Then, the central processor 101 of the main exchange center 100 judges whether a signal requesting the SMS message is received from the corresponding extension unit in step S31.

If it is judged that the signal requesting the SMS message is received from the corresponding extension unit via the extension subscriber circuit 103, the central processor 101 retrieves and transfers the SMS message stored in the second buffer 240 of the SMS processor 200 to the corresponding extension unit via the switch 104 and the extension subscriber circuit 103 of the main exchange center 100 in step S32.

The PBX system 2 for performing an SMS according to extension lines of the invention can be exemplified in various forms according to the type of the main line circuit 107 used by the main exchange center 100 and the extension unit-matching information stored in the data storage 210 of the SMS processor 200.

The main line circuit 107 of the main exchange center 100 can be constituted of an analog main line circuit or a digital main line circuit.

If the main line circuit 107 is constituted by an analog main line circuit, data received from the SMSC via the main line circuit 107 may contain the CID of the SMSC, the CID of an originating unit which sends the corresponding SMS message and sub-address information if a sub-address is used.

On the other hand, if the main line circuit 107 is constituted by a digital main line circuit, data received from the SMSC via the main line circuit 107 may contain the CID of the SMSC, the CID of an originating unit which sends the corresponding SMS message, DDI or MSN number and sub-address information in case that sub-address is used.

Accordingly, individual extension unit-matching information tables to be stored in the data storage 210 of the SMS processor 200 can be constituted according to several situations which use one or more selected from the group consisting of the MSN number of the destination unit, the DDI number of the destination unit, the CID of the originating unit and the sub-address of the destination unit.

In addition, the data storage 210 of the SMS processor 200 may have one or more tables which use at least one or more selected from the group consisting of the MSN number of the destination unit, the DDI number of the destination unit, the CID of the originating unit and the sub-address of the destination unit.

Accordingly, the SMS distributor 220 of the SMS processor 200 can use the various extension unit-matching information tables stored in the data storage 210 to analyze the SMS message stored in the first buffer 230 in order to search for a destination unit which the corresponding SMS message is headed for.

The operation executed by the SMS distributor 220 can be modified variously according to the type of the extension unit-matching information tables of the data storage 210 which the SMS distributor 220 of the SMS processor 200 refers to.

FIG. 6 is an example of an extension unit-matching information table in the PBX system 2 of the invention, which uses DDI numbers extracted from SMS messages.

Referring to FIG. 6, in the extension unit-matching information table, extension unit numbers are matched to DDI numbers, respectively. For example, DDI number 4301 extracted from an SMS message by the SMS distributor 220 is designated to a destination extension unit having extension number 2001, and DDI number 4302 is designated to a destination extension unit having extension number 2002.

FIG. 7 is a table illustrating the structure of a buffer, such as second buffer 240, of the invention.

Referring to FIG. 7, extension numbers are assigned with memory regions capable of storing SMS messages, respectively.

SMS messages are stored in sequence into the memory regions assigned to the extension numbers, and when the assigned memory regions are filled up, the stored SMS messages are canceled according to their order of storage so that new SMS messages can be stored.

A process of distributing received SMS messages by the SMS distributor 220 in the PBX system 2 of the above structure will be described as follows:

The SMS distributor 220 stores SMS messages received from the SMSC into the first buffer 230, and then analyzes the SMS messages stored in the first buffer 230 to extract DDI numbers from the SMS messages.

For example, when DDI number 4301 is extracted from an SMS message, it can be seen that the number of an extension unit, which the corresponding SMS message is headed for, based upon the extension unit matching table shown in FIG. 6 is 2001.

Therefore, the SMS distributor 220 transfers the corresponding SMS message from the first buffer 230 into a memory region in the second buffer 240 assigned to extension number 2001 as shown in FIG. 7.

Of course, when the corresponding SMS message is stored in the corresponding memory region of the second buffer 240, the SMS message is canceled from the first buffer 230.

As shown in FIG. 7, five SMS messages are stored in the memory region assigned to extension number 2001, two SMS messages are stored in a memory region assigned to extension number 2002, one SMS message is stored in a memory region assigned to a memory region assigned to extension number 2003, and three SMS messages are stored in a memory region assigned to extension number 2004.

Then, when a signal requesting a corresponding SMS message is received from an extension unit, the central processor 101 of the main exchange center 100 reads the corresponding message stored in the second buffer 240 and transfers the message to the corresponding extension unit.

Once the SMS message is transferred to the corresponding extension unit from the second buffer 240, the SMS distributor 220 can cancel the SMS message from the second buffer 240 or leave the SMS message as it is, so that it can be naturally canceled as newer SMS messages are stored in the second buffer 240.

FIG. 8 is an extension unit-matching information table in the PBX system 2 of the invention, which uses MSN numbers extracted from SMS messages.

Referring to FIG. 8, the extension unit-matching information table contains extension unit numbers which are matched to MSN numbers, respectively. For example, when MSN numbers are extracted by the SMS distributor 220 from SMS messages, MSN number 4301 is designated to a destination unit having extension number 2001, and MSN number 4302 is designated to a destination unit having extension number 2002.

In the meantime, MSN number 4303 is designated to a destination unit having extension number 3000. However, extension number 3000 has technical meanings different from those of extension numbers 2001 and 2002.

That is, in some situations, the PBX system 2 needs to sort several extension units into one group in order to transfer an SMS message to all of the extension units of the group in a bundle.

Accordingly, extension number 3000 in FIG. 8 is associated with the grouped SMS transmission.

That is, if MSN number 4303 is extracted from any SMS message, the SMS distributor 220 transfers the corresponding SMS message to all of extension units assigned to a group 3000 instead of a single extension unit assigned to group 3000.

For the purpose of this, the SMS distributor 220 recognizes the extension units assigned to group 3000 in the grouped extension unit-matching information table as destination units, and stores the corresponding SMS message into a memory region of the second buffer 240 assigned to the group 3000 extension units.

Referring to FIG. 9, extension numbers 3001, 3002, 3003 and so on are designated to the group extension number 3000. Therefore, the corresponding SMS message is stored in the memory region of the second buffer 240 assigned to extension numbers 3001, 3002 and 3003.

FIG. 10 is another extension unit-matching information table in the PBX system 2 of the invention, which uses CIDs of originating units extracted from SMS messages.

Referring to FIG. 10, in the extension unit-matching information table, extension unit numbers are matched according to CIDs of originating units, respectively. For example, when CIDs of originating units are extracted from the SMS messages by the SMS distributor 220, originating unit CID 02-AAA-AAAA is designated to a destination unit having an extension number 2001, originating unit CID 02-BBB-BBBB is designated to a destination unit having an extension number 2002, originating unit CID 031-CCC-CCCC is designated to a destination unit having an extension number 2003, and originating unit CID 010-DDD-DDDD is designated to a destination unit having an extension number 2004.

The principle of the extension unit-matching information table according to originating unit CIDs will now be described.

A received SMS message contains an originating unit CID, which is different from a CID from the SMSC.

When receiving calls via outside public wire/wireless communication networks, individual extension subscribers of the PBX system 2 have specific frequent telephone numbers.

Therefore, it is possible to directly forward a frequent CID to a specific extension subscriber. That is, a call is to be forwarded directly to a specific extension subscriber A, if its CID confirms that the call is from the home of the extension subscriber A. Likewise, if an SMS is received from the SMSC rather than a telephone signal, an SMS message is transferred to the second buffer assigned to the extension subscriber A, notifying the extension subscriber A of the SMS message.

For example, in case that the PBX system 2 is installed in a company, staffs of this company have their own home telephone numbers different from one another.

Referring to FIG. 10, the extension subscribers have specific numbers different from one another. That is, the extension subscriber of the extension number 2001 has home telephone number 02-AAA-AAAA, the extension subscriber of extension number 2002 has home telephone number 02-BBB-BBBB, the extension subscriber of extension number 2003 has home telephone number 031-CCC-CCCC, and the extension subscriber of extension number 2004 has mobile phone number 010-DDD-DDDD of his/her parent.

In this case, when an originating unit CID extracted from an SMS message is 02-AAA-AAAA, it can be understood that a telephone call is received to the extension subscriber having the extension number 2001 from his/her home.

The following description will present a process for distributing SMS messages received in the SMS distributor 220 of the PBX system 2 having the afore-described structure.

Upon receiving an SMS message from the SMSC, the SMS distributor stores the received SMS message into the first buffer 230, and analyzes the SMS message stored in the first buffer 230 to extract an originating unit CID from the SMS message.

For example, when an originating unit CID extracted from an SMS message is 010-DDDD-DDDD, it can be seen that the SMS message is headed for an extension unit 2004 based upon the extension unit matching table shown in FIG. 10.

Therefore, the SMS distributor 220 stores the corresponding SMS message, which is stored in the first buffer 230, into a memory region of the second buffer 240 assigned to extension number 2004.

FIG. 11 is yet another extension unit-matching information table in the PBX system 2 of the invention, which uses sub-addresses extracted from SMS messages.

Sub-addresses may be useful in the case of an analog trunk or ISDN (Integrated Services Digital Network) but not DDI/MSN.

Referring to FIG. 11, an extension unit-matching information table has sub-addresses to which extension numbers are matched. For example, if sub-address 0 of a main line 7001 (279-4301) is extracted by the SMS distributor 220 from an SMS message, the SMS message is designated to an extension unit having extension number 2001. If sub-address 0 of the main line 7002(279-4302) is extracted by the SMS distributor 220 from an SMS message, the SMS message is designated to an extension unit having extension number 2011.

According to the afore-described embodiment, when the PBX system 2 receives an SMS message headed for an extension unit, the PBX system 2 temporarily stores the SMS message, notifies the extension unit of the SMS message, and if the extension unit wants to receive the SMS message, transfers the SMS message to the extension unit.

However, when the PBX system 2 receives an SMS message headed for an extension unit according to an option, the PBX system 2 temporarily stores the SMS message, and transfers the SMS message to the extension unit to display the receipt of the SMS message on an LCD of the extension unit.

According to the invention, although a PBX system 2 uses a small number of main lines, the PBX system 2 can provide an SMS to individual extension subscribers regardless of the number of main lines unlike the prior art in which the SMS is provided based upon individual mobile units.

That is, the PBX system 2 has an extension unit-matching information table by which individual extension units are matched with information contained in SMS messages. When receiving an SMS message, the PBX system 2 can extract originating unit CIDs from the SMS message in order to designate corresponding extension units, which the SMS message is headed for, based upon the extension unit-matching information table. Alternatively, the PBX system 2 can extract DDI, MSN or sub-addresses of destination units from the SMS message based upon the extension unit-matching information table.

In this way, although PBX system 2 uses a small number of main lines, the PBX system 2 can designate individual extension units regardless of the number of main lines in order to provide the SMS to the individual extension subscribers in a public wired/wireless communication network.

What is claimed is:

1. A Private Branch Exchange (PBX) system, comprising:
a main exchange center connected to a plurality of extension units to provide a private Short Message Service (SMS) to the extension units, determining a type of a main line interface via which a ring signal is received and whether the ring signal received via the corresponding main line type is received from an SMS center (SMSC), and notifying an SMS processor of the receipt of an SMS message when it is determined that the ring signal is received from the SMSC; and
the SMS processor mutually matching originating or destination unit information differently contained in the SMS message according to the main line interface type of the main exchange center with extension unit information corresponding to the information to construct a table from extension unit-matching information, establishing a communication path with the SMSC via the main exchange center to receive an SMS message according to the notification of receipt of an SMS from the main exchange center, extracting the originating unit information or destination unit information contained in the received SMS message and differently constituted according to the main line interface type, obtaining extension unit information corresponding to the extracted originating unit information or destination unit information from the extension unit information constituted in the form of a table, and distributing the received SMS message to an extension unit corresponding to the obtained extension unit information via the main exchange center.

2. The system according to claim 1, wherein the SMS processor includes:
a data storage mutually matching the originating or destination unit information differently contained in the SMS message according to the main line interface type of the main exchange center with the extension unit information corresponding to the information to store the extension unit-matching information in the form of a table;
a first buffer storing the received SMS message;
a second buffer storing the received SMS message in different regions according to destination extension unit; and
an SMS distributor temporarily storing the SMS message received via the main exchange center in the first buffer, extracting the originating or destination unit information contained in the SMS message stored in the first buffer and differently constituted according to the main line interface type, obtaining destination extension unit information corresponding to the extracted originating or destination unit information from the extension unit-matching information contained in the data storage to store the received SMS message to correspond to the obtained destination unit information in the second buffer, and transmitting the SMS message stored in the second buffer to the corresponding destination extension unit via the main exchange center according to a request of an SMS message received from the corresponding extension unit via the main exchange center.

3. The system according to claim 2, wherein the extension unit-matching information stored in the data storage includes at least one of extension unit information corresponding to Caller Identification (CID) information of the SMSC, and extension unit information corresponding to CID information of an originating unit when the main line interface of the main exchange center is an analog main line interface, and extension unit information corresponding to sub-address information when the sub-address is used.

4. The system according to claim 2, wherein the extension unit-matching information stored in the data storage includes at least one of extension unit information corresponding to Caller Identification (CID) information of the SMSC, extension unit information corresponding to CID information of an originating unit, extension unit information corresponding to a Direct Dial-in (DDI) number, and extension unit information corresponding to a Multi-subscriber Numbering (MSN) number when the main line interface of the main exchange center is a digital main line interface, and extension unit information corresponding to sub-address information when the sub-address is used.

5. The system according to claim 1, wherein the extension unit-matching information includes information about a plurality of extension numbers constituting a group and group identification information corresponding to the group.

6. A Short Message Service (SMS) method according to extension unit in a private branch exchange (PBX) system, the method comprising:
mutually matching destination or originating unit information differently contained in an SMS message according to a main line interface type with extension unit information corresponding to the information to construct extension unit-matching information in the form of a table;
determining a type of a main line interface via which a ring signal is received, and whether the ring signal received via the corresponding main line type is received from an SMS center (SMSC);
generating a notification of the receipt of an SMS message when it is determined that the ring signal is received from the SMSC as a result of the determination;
establishing a communication path with the SMSC according to the notification of receipt of the SMS message to receive an SMS message, and storing the received SMS message in a first buffer;
analyzing the SMS message stored in the first buffer to extract originating or destination unit information contained in the SMS message and differently constituted according to the main line interface type; and
obtaining extension unit information corresponding to the extracted originating or destination unit information from the extension unit-matching information constituting the table, storing the received SMS message in a second buffer to correspond to the obtained extension unit information, and distributing the SMS message stored in the second buffer to the corresponding extension unit according to a request of an extension unit corresponding to the obtained extension unit information.

7. The method according to claim 6, wherein distributing the SMS message to the corresponding extension unit includes:
generating a ring signal for notifying the corresponding extension unit of the receipt of the SMS message using the obtained extension unit information; and
transmitting the SMS message stored in the second buffer to the corresponding extension unit when the corresponding extension unit requests an SMS message according to the notification.

8. The method according to claim 6, wherein the extension unit-matching information constituted in the form of a table includes at least one of extension unit information corresponding to Caller Identification (CID) information of the SMSC, extension unit information corresponding to CID information of an originating unit and extension unit information corresponding to sub-address information when the sub-address is used in a case where the main line interface receiving the ring signal is an analog main line interface.

9. The method according to claim 6, wherein the extension unit-matching information constituted in the form of a table includes at least one of extension unit information corresponding to extension unit information corresponding to Caller Identification (CID) information of the SMSC, extension unit information corresponding to CID information corresponding to an originating unit, extension unit information corresponding to a Direct Dial-in (DDI) number, and extension unit information corresponding to a Multi-subscriber Numbering (MSN) number when the main line interface receiving the ring signal is a digital main line interface, and extension unit information corresponding to sub-address information when the sub-address is used.

10. The method according to claim 6, wherein the extension unit-matching information includes information about a plurality of extension numbers constituting a group and group identification information corresponding to the group.

* * * * *